Feb. 5, 1957  P. F. GOOD  2,780,342
POSITIVE DRIVE WORK FEEDER
Filed March 14, 1951  3 Sheets-Sheet 1
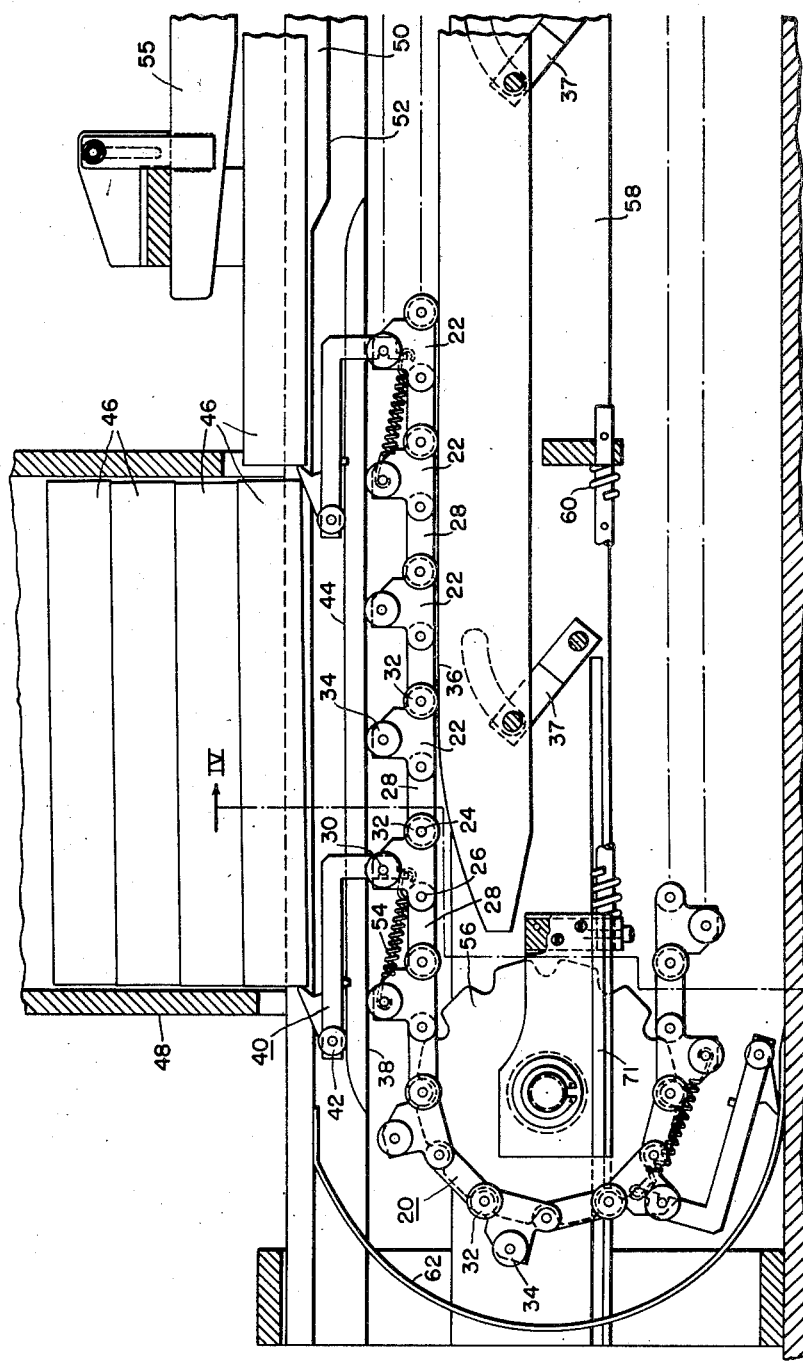
Fig. I.
WITNESSES:
Robert C. Baird
K. Y. Brodahl
INVENTOR
Paul F. Good.
BY
F. E. Browder
ATTORNEY Feb. 5, 1957 P. F. GOOD 2,780,342
POSITIVE DRIVE WORK FEEDER
Filed March 14, 1951 3 Sheets-Sheet 2
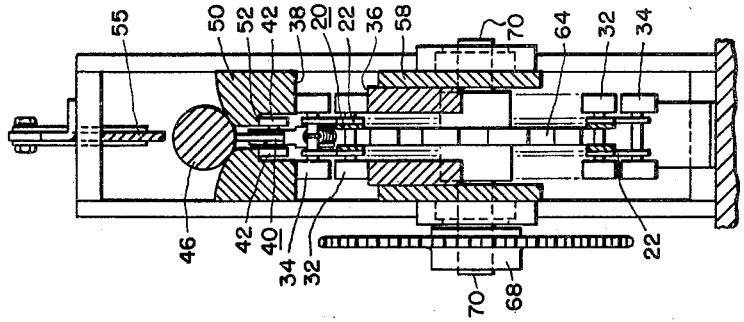
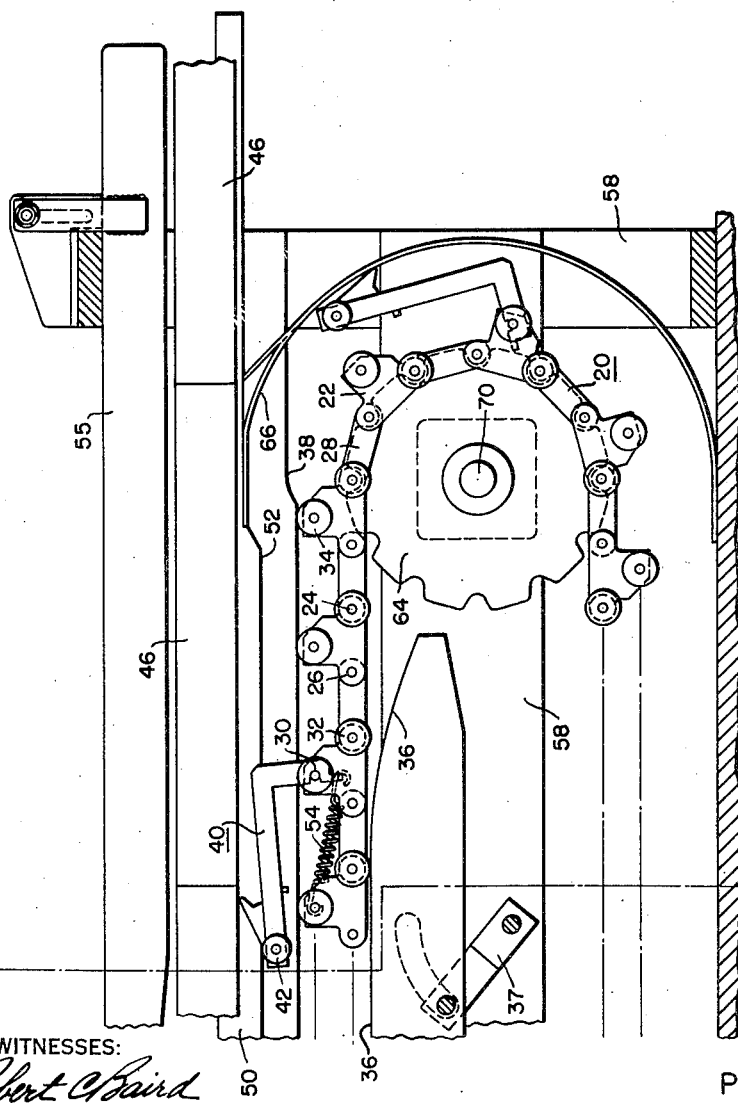
WITNESSES:
Robert C Baird
R. G. Brodshl
INVENTOR
Paul F. Good.
BY
F. E. Browder
ATTORNEY Feb. 5, 1957  P. F. GOOD  2,780,342
POSITIVE DRIVE WORK FEEDER
Filed March 14, 1951  3 Sheets-Sheet 3

INVENTOR
Paul F. Good.
BY
J. E. Browder
ATTORNEY

United States Patent Office 2,780,342
Patented Feb. 5, 1957

2,780,342

POSITIVE DRIVE WORK FEEDER

Paul F. Good, Baltimore, Md., assignor to Westinghouse Electric Corporation, East Pittsburgh, Pa., a corporation of Pennsylvania Application March 14, 1951, Serial No. 215,467

3 Claims. (Cl. 198—170)

My invention relates to work handling apparatus and, more particularly, to feeder equipment for feeding rod-like workpieces to processing equipment, such as heat-treating apparatus.

The feeding of workpieces to certain processing machines, such as induction-hardening apparatus, grinders, flame hardening units, automatic inspection machines, etc., presents a difficult problem, primarily because of the exacting feed requirements and the adverse conditions under which the feeder equipment must operate. To be practical, particularly for induction heating apparatus, the feeder equipment must be reasonable in initial cost and maintenance expenses; must feed the workpieces through the induction heat-treating apparatus at a substantially uniform rate to ensure the uniform heat treatment by such apparatus of said workpieces; must be readily adjustable to handle workpieces having different lengths or different diameters such as cylindrical, splined or square shafts or other members; and must satisfactorily handle workpieces having minor irregularities, such as grooves, keyways, holes, etc. Also, the feeder equipment must be reliable in operation even though the workpiece surfaces are contaminated by dirt and oily substances.

In accordance with the prior art feeder equipment with which I am familiar, particularly with regard to equipment for use with induction scanning apparatus, there have been two distinct types of feeder equipment used. One of these is the friction feed type, and the other is the positive feed type. The primary objection to the friction type of feeder equipment is with regard to the unreliable operation with oil or grease-covered workpieces, which results in objectionable slippage between the driving rollers of the friction feed equipment and the workpieces. Respecting workpieces which have oil and grease on them, the positive type of feeder equipment is more desirable. However, the latter type of equipment has been objectionable respecting the desired adjustability to handle workpieces of different lengths and sizes.

When it is desired to handle workpieces having different lengths or diameters, the prior art positive drive type of feeder equipment has required a considerable number of different driving chains to handle the range of lengths and diameters of workpieces which some processors desire to handle with their induction scanning equipment. The initial cost of such chains, and the inconvenience of changing them, have been very objectionable.

Accordingly, it is an object of my invention to provide a feeder apparatus which will handle a wide range of workpiece lengths and diameters without the necessity of changing the driver chain.

It is another object of my invention to provide a feeder apparatus which is reasonable in initial cost and relatively inexpensive to maintain and operate.

It is still another object of my invention to provide a feeder apparatus which will feed workpieces to processing machines such as induction heat-treating equipment, said feed being at a substantially uniform rate as desirable in the operation of such induction heat-treating equipment.

It is a further object of my invention to provide feeder equipment for rod-like workpieces which is easily adjustable to handle such workpieces of different lengths or diameters.

An additional object of my invention is to provide feeder equipment which will satisfactorily handle workpieces having minor irregularities such as grooves, keyways, holes, etc.

A still additional object of my invention is to provide a feeder apparatus which will reliably operate even though the external surfaces of the pieces to be heat treated are somewhat oil or grease covered.

My invention comprises a feeder apparatus for feeding rod-like workpieces to processing machines such as induction scanning equipment, said feeder apparatus including a conveyor means in the form of an endless chain made up of a plurality of link members. Each of the link members includes at least a first and a second pivot point with a support roller at one of the pivot points. The link members are connected together, either directly or through an additional section member, such that relative to the direction of movement of the workpieces, the support rollers for each link member can be spaced apart in varying degrees to determine the effective length of the chain member. A plurality of feeder dog members is connected to the conveyor chain at varying intervals along said chain, the interval being determined by the length of the particular workpiece to be treated, each of said feeder dog members being adapted for connection to any one of said link members.

A track member is provided having a first, a second, and a third support surface. The first and second support surfaces are adjustably spaced and are operable with the respective support rollers of each link member, such that the spacing between the first and second support surfaces and the spacing between the support rollers for each link member, and hence the effective length of the conveyor chain, are adjustable. The third support surface is operable with a support roller fastened to the trailing end of each feeder dog member to determine the relative position of each feeder dog member respecting the workpieces.

The novel features that I consider characteristic of my invention are set forth with particularity in the appended claims. The invention itself, however, both as to its organization and its method of operation, together with additional objects and advantages thereof, will best be understood from the following description of specific embodiments when read in conjunction with the accompanying drawings, in which:

Figure 1 is a cross-sectional view of a portion of my feeder drive apparatus;

Fig. 2 is a cross-sectional view showing the remaining portion of my feeder drive apparatus respecting the portion shown in Fig. 1;

Fig. 3 is a sectional view taken along line III—III of Fig. 2;

Figure 5:
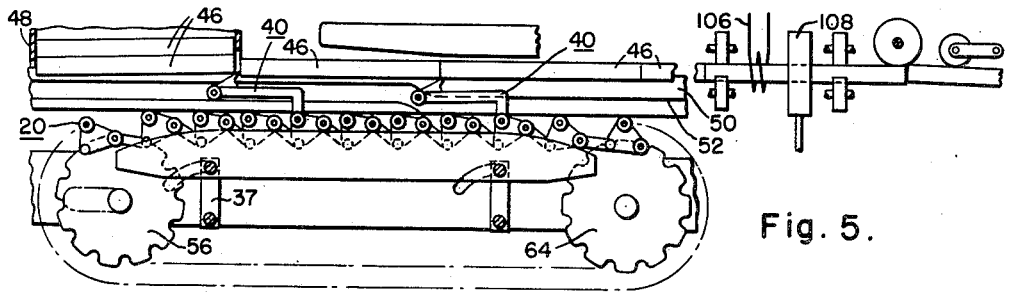
Fig. 5 is a diagrammatic view of my over-all feeder apparatus showing its operable relationship with a particular induction hardening and work handling equipment.

In Fig. 1, there is shown a positive drive type feeder apparatus including a conveyor means, comprising an endless chain member 20 made up of a plurality of individual link members 22. Each of the link members 22 has a first and a second pivot point 24 and 26, the first pivot point 24 of each link member 22 being connected to the second pivot point 26 of an adjacent link member 22 through an intermediate section member 28. The link members 22 are connected together in this manner such that an endless chain 20 of them is formed. A third pivot point 30 is provided for each link member 22, said third pivot point 30 being away from the imaginary line between the first and second pivot points 24 and 26 for each link member 22. Support rollers 32 and 34 are fastened to each link member 22 at the first and third pivot points 24 and 30, respectively. A first track member support surface 36 is provided for the support roller 32 fastened to the first pivot point 24 of each link member 22. A second track member support surface 38 is provided for the support rollers 34 fastened to the third pivot point 30 of each link member 22. The first of said support surfaces 36 is adjustably spaced respecting the second of said support surfaces 38 by means of a pivoted arm 37 which is keyed to a suitable control lever, such that the spacing therebetween is effective to determine the relative angular position of each of said link members 22 respecting said support surfaces 36 and 38, thereby adjusting the chain length and the distance between the feeder dogs 40 to accommodate a particular length workpiece.

A feeder dog member 40 is connected to one of said link members 22 at the third pivot point 30, each of said feeder dog members 40 having a support roller 42 at the trailing end of said feeder dog member 40, said support roller 42 being operable with a third track member support surface 44. The latter support surface 44 is shaped to determine the operation of said feeder dog members 40 respecting the workpieces 46 which are supplied from a magazine 48 and moved along a workpiece-carrying means 50 for subsequent processing. A fourth support surface 52 is provided and adapted for operation with the support roller 42 on the trailing end of each of said feeder dog members 40 to effectively remove the feeder dog member 40 from operation with the workpieces 46 after a predetermined stage of operation, namely after each succeeding workpiece has left the magazine and has physically caught up with the preceding workpiece. During the latter movement the succeeding workpiece rides up on the trailing edge of the preceding feeder dog until it is in physical contact with the preceding workpiece. Each feeder dog member 40 is tension biased by a spring member 54 in a direction away from said third track support surface 44 toward said fourth track support surface 52. A workpiece-guiding member 55 is provided to assure the proper alignment of the workpieces 46 as they move toward the subsequent processing apparatus.

A support pulley member 56 is provided for the conveyor chain 20, said support pulley member 56 having a plurality of indentations along its peripheral surface corresponding to the pivot points of each of the link members 22. The axis of the support pulley 56 is adjustably mounted on a supporting frame 58, including a spring-biasing member 60 such that the conveyor chain 20 is maintained in proper tension for its operation. The first 36, second 38, third 44, and fourth 52 track support surfaces are mounted on the same frame member 58. A container track 62 is provided for the feeder dog members 40 as the respective link members 22 pass around the support pulley 56.

In Fig. 2 is shown the remaining portion of the feeder drive apparatus which is partially shown in Fig. 1. A drive pulley member 64 is shown having its axis rigidly fastened to the supporting frame 58. The terminating section of the first track support surface 36 is shown, and the terminating section of the second track support surface 38 is shown. The terminating section of the fourth track support surface 52 leads to another feeder dog track 66 to contain the movement of each feeder dog member 40 as the respective link members 22 pass around the drive pulley 64.

In Fig. 3 is shown a cross-sectional view of the feeder drive apparatus previously described respecting Figs. 1 and 2, and taken along line III—III of Fig. 2. In Fig. 3 is shown the operation of the drive pulley 64 respecting the conveyor chain 20 and the relative position of the workpiece-carrying means 50 and feeder dog 40, respecting each workpiece 46.

A workpiece 46 is shown supported by the workpiece-carrying means 50 with a feeder dog 40 and the feeder dog support rollers 42 shown riding against the fourth track support surface 52. The support rollers 32 and 34 of the first and third pivot points 24 and 30 for a link member 22 are shown riding respectively on the first track support surface 36 and the second track support surface 38. The drive pulley 64 is shown fastened to the supporting frame 58 with a suitable power supply means 68 connected to its center axis 70. The support rollers for one of the link members 22 are shown leaving the drive pulley 64. The workpiece-guiding means 55 is shown.

Figures 4, 7:
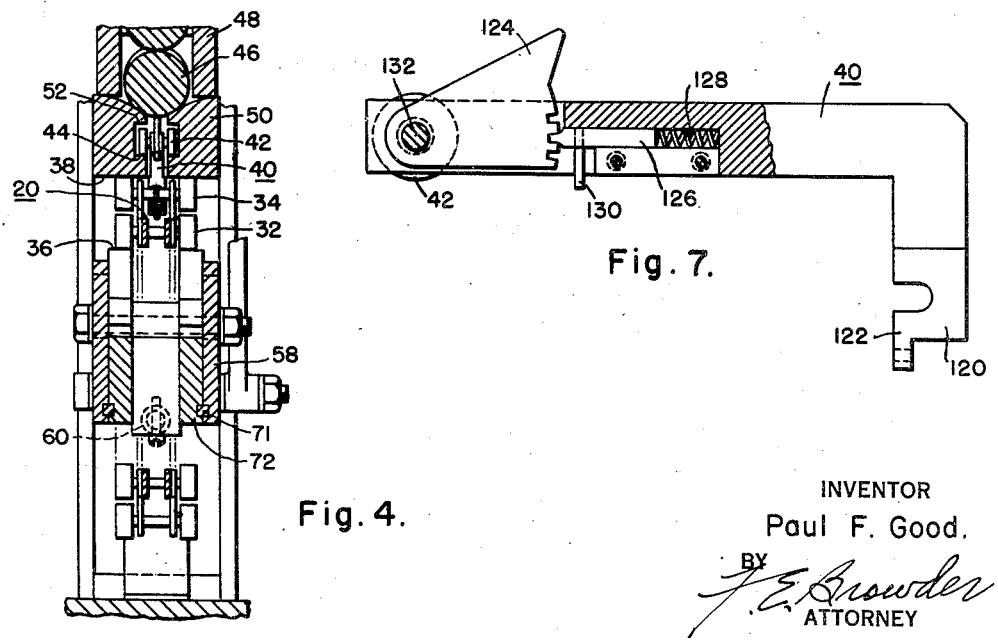
Fig. 4 is a sectional view taken along line IV—IV of Fig. 1.
Fig. 7 shows in greater detail the feeder dog member used with my feeder apparatus.

In Fig. 4 is shown a sectional view taken through line IV—IV on Fig. 1. Here a workpiece 46 is shown carried by the work-carrying means 50 with a cross section of the conveyor chain 20 showing the support rollers 32 and 34 riding on respectively the first and second track support surfaces 36 and 38. The third and fourth track support surfaces 44 and 52 and the support rollers 42 of the feeder dog member 40 are shown. The adjustable support arrangement of the support pulley 56 (latter not shown) is shown comprising the inner movable support member 72 which is keyed by means of a key 71 to the outer frame member 58 through a slot in the latter member 58 which extends longitudinally a distance sufficient to allow the desired relative movement between the pulley support member 72 and the frame member 58. The compression biased spring member 60 is shown in dotted lines.

In Fig. 5, there is diagrammatically shown the over-all feeder drive as used in induction heat treating apparatus showing how the workpieces 46 are taken from the supply magazine 48, one by one, by the individual feeder dog members 40, and moved along the work-carrying means 50 into operative position respecting an induction heating coil 106 and a quench unit 108, and subsequently to suitable work-handling apparatus for handling the hardened workpieces. The conveyor chain is shown in a relatively compressed condition, with track support surface 36 in its uppermost position by means of arm 37.

More specifically, the operation of the feeder drive as used in the subject workpiece processing equipment is as follows: When track support surface 36 is in its lowermost position, as determined by adjustment of arm 37, pulley 56 will move to the left tending to stretch the conveyor chain so that section members 28 and link members 22 will be extended in end-to-end relation, as shown in Fig. 1, with the feeder dogs 40 spaced a relatively greater distance apart. Thus, with track support 36 in its lowermost position and substantially parallel to track support 38, the chain pathway has a transverse dimension perpendicular to surface 36 which is larger than the maximum transverse width of the link members 22, including the support rollers 32 and 34. As support surface 36 is gradually elevated, support rollers 32 will be pushed upward by surface 36, and support rollers 34 will be restrained against upward movement by support surface 38. The upward motion of support rollers 32 will thus rotate each link member 22 about the axis of support rollers 34, in a counterclockwise direction as seen in Fig. 1, to a pivoted position as shown in Fig. 5. With the track portion 36 in its uppermost position of adjustment, as determined by arm 37, the length of the chain portion between adjacent feeder dogs 40 is effectively shortened, as shown in Fig. 5, where the support rollers 32 and support rollers 34 are almost in the same plane, with the plane of support rollers 34 being only slightly above the plane through the axes of support rollers 32.

As shown in Fig. 5, the section members 28 are angularly disposed with respect to the support surfaces 36 so as to join the depressed second pivot point 26 to the elevated first pivot point 24 of the next adjacent link member. The chain portion between adjacent feeder dogs 40 is retained in an effectively shortened position by surfaces 36 and 38 acting against the support rollers to restrain the tension force applied to the chain by the driving gear 64 acting to move the chain portion longitudinally along the pathway between surfaces 36 and 38. The spacing of the feeder dogs 40 is determined by the adjusted position of support surface 36, which is continuously adjustable from a lowermost position, as shown in Fig. 1, to an uppermost position, as shown in Fig. 5.

Spring 54 is a tension biasing spring which is operative to bias each feeder dog member 40 upwardly away from third track support surface 44, so as to insure smooth and trouble free operation of the feeder dogs with dependable engagement of successive workpieces 46 by successive feeder dogs 40. The apparatus, as shown in Figs. 1 and 2, is complete and operative without the inclusion of spring member 54. In order to improve the smoothness and dependability with which the feeder dogs 40 operate, a plurality of spring members 54 may be connected to successive feeder dogs by connection to extension 122 on the feeder dog and connection of the other end of each spring to the axis of the next adjacent roller 34.

As shown in Fig. 5, the first track support surface 36 and the second track support surface 38 are spaced apart a relatively small distance to provide a pathway therebetween having a transverse dimension perpendicular to surfaces 36 and 38, which dimension is substantially less than the predetermined transverse distance between the axes of rollers 32 and 34 plus the radius of the first roller 32 and the radius of the second roller 34. Because the transverse dimension of the chain pathway is smaller than the transverse dimension of the chain, the successive link members as they move longitudinally to the right (as in Fig. 1) will pass between the second support surface 38 and the sloping end portion of first support surface 36. The first support rollers 32 will contact the sloping end portion of support surface 36 and will be gradually elevated as they continue to move longitudinally between the first and second support surfaces. Elevation of support rollers 32 causes each successive link member to be pivoted about the axis of support roller 34 as the link member rides up the sloped end portion of support surface 36. The link members 22 and section members 28 are thus successively pivoted to a relatively folded position, as shown in Fig. 5, thereby decreasing the effective length of the chain portion between successive feeder dogs.

Figure 6:
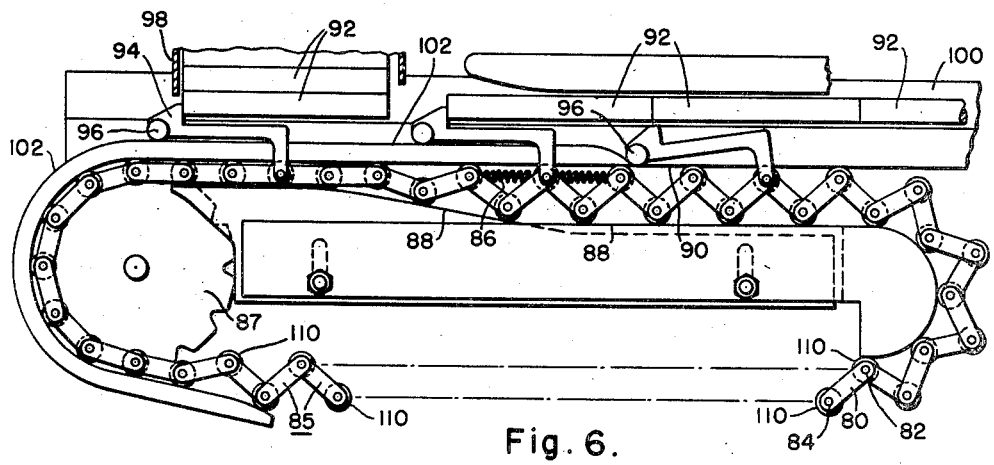
Fig. 6 shows a modification of my feeder apparatus.

In Fig. 6, there is shown a modification of the conveyor chain of Figs. 1 through 5. The conveyor chain shown in Fig. 6 is made up of a plurality of link members 80, each having a first and a second pivot point 82 and 84. The first pivot point 82 of each link member 80 is connected to the second pivot point 84 of another link member 80 such that a continuous chain 85 is formed thereby. A tension biasing spring 86 is provided between the first pivot points 82 of alternate link members 80. A drive pulley 87 having suitable indentations on its periphery surface to mesh with the conveyor chain 85 and provide a positive relative movement thereto is provided to force the conveyor chain 85 between a first and a second track support surface 88 and 90. The first track support surface 88 is adjustably spaced relative to the second track support surface 90 such that the spacing therebetween is effective to determine the relative length of the conveyor chain 85 respecting the movement of the workpieces 92 which is desired. Feeder dog members 94 are connected to certain of the link members 80 dependent upon the length of workpiece 92 to be handled and the desired spacing between the feeder dog members 94. The trailing end of each feeder dog member 94 is provided with a support roller 96, which roller is operable with a third track support surface 102 such that the feeder dog members 94 move the workpieces 92 from the workpiece magazine 98 and along the work-carrying means 100. An extension of the first track support surface 88 is provided to support the conveyor chain 85 as it completes its work cycle and is returned to a position ready for passage around the drive pulley 87. The third track support surface 102 is extended around and beyond the drive pulley 87 such that each feeder dog member 94 is properly brought into position for connection with one of the workpieces 92 when the conveyor chain 85 is in proper position therefor.

In Fig. 7, there is shown a feeder dog member 40 in detail. Each feeder dog member 40 comprises an arm having a first end 120 which is adapted for connection to one of the pivot points of a link member 22. A slight extension 122 is provided beyond the connection to the link member 22 for connection to a tension biasing spring member 54. The opposite end of the feeder dog member 40 arm is provided with a support roller 42 and a dog member 124 which is pivotable around a pivot point 132. The dog member 124 is provided with a plurality of teeth or indentations each of which is adapted for operation with a locking key 126 which is held in position by a compression biased spring 128 and supported by the arm of the feeder dog member 40. Operation of key 126 is by means of pin 130.

The positive drive feeder apparatus of Fig. 1 operates to remove one by one from a magazine 48 workpieces 46 to be processed by suitable equipment such as induction-hardening apparatus (not shown in Fig. 1). An endless conveyor chain 20 made up of individual link members 22 successively connected together is provided with feeder dog members 40 connected to said conveyor chain 20 at spaced intervals dependent upon the length of the workpiece 46 to be handled. The feeder dog members 40 can be positioned along the conveyor chain 20 at various intervals dependent upon the length of the workpiece 40, such adjustment being accomplished merely by fastening each feeder dog member 40 to a different one of the link members 22 of the conveyor chain 20 and separating them by a sufficient number of said link members 22 that the effective spacing between the feeder dog members 40 is approximately that desired to satisfactorily handle the workpieces 46 undergoing treatment. Adjustment of said feeder dog spacing within the necessary narrow limits can be accomplished by adjusting the relative spacing between the first and second track surfaces 36 and 38. The first and second track support surfaces 36 and 38, as shown in Fig. 1, are adjusted for maximum distance between the feeder dog members 40 for a given connection of said feeder dog members 40 to respectively different links 22 of the conveyor chain 20. The operating distance between the feeder dog members 40 can be increased by decreasing the spacing between the first and second track support surfaces 36 and 38 by adjustment of the first track support surface 36 toward the second track support surface 38. In this manner the conveyor chain 20 can be contracted to accommodate shorter workpieces than the workpiece 46 shown in Fig. 1 with a given connection of said feeder dog members 40 to the conveyor chain 20. If the length of the workpieces 46 goes beyond the range of adjustability of the conveyor chain 20 by means of the spacing between support surfaces 36 and 38, the feeder dog members 40 can be removed from the chain 20 and replaced as required with the conveyor chain 20 itself being subsequently adjusted by means of these surfaces 36 and 38 to provide the proper distance between the feeder dog members 40.

The workpieces 46 are loaded into the magazine 48 and gravity fed into position for the feeder dog members 40 to remove them one by one from the magazine 48. Each feeder dog member 40 pushes on one end of a workpiece 46. As the workpiece 46 advances from the magazine 48, the conveyor chain 20 contracts, as determined by the spacing between the first and second track support surfaces 36 and 38, to effectively take up any slack between the respective workpieces 46 to form a continuous line of workpieces 46 which are contiguous end-to-end. The successive feeder dog member 40 then picks up another workpiece 46 and the previous feeder dog member 40 moves the whole line of workpieces 46 toward the subsequent processing equipment. Due to the contraction of the conveyor chain, the workpiece moved by the successive feeder dog member rides up on the dog of the previous feeder dog and contacts the previous workpiece. Then as the feeder dog members advance to the termination of the third track support surface 44, the fourth track support surface 52 operates with the support roller 42 at the trailing end of each feeder dog member 40 to disengage that inactive feeder dog member from the line of workpieces which it is moving. A workpiece-guiding member 55 is provided to orient back into line any workpiece 46 which may be out of line due to its riding up on the rear surface of the previous feeder dog member.

The proper adjustment of the first track support surface 36 can be accomplished by means of screws or parallel linkages, or in any manner well known to those skilled in the art, such as the pivotable arms 37 keyed to an operating lever arrangement. After the first track support surface 36 has been adjusted so that the feeder apparatus handles a particular length of workpiece 46, the first track support surface 36 is firmly locked in place by any suitable means, such as a lock operable with said operating lever. Feeder apparatus in accordance with my invention can be effective in actual practice to vary the spacing between feeder dog members 40 by approximately 25%. This large variation allows the feeder apparatus to handle workpieces of different lengths over a wide range.

For purposes of example and by no means intended for limitation, the following lengths of workpieces have been handled in actual practice by feeder apparatus having a number of dogs with maximum spacing between dogs as shown in the following table. This is based upon the use of a conveyor chain which was 120 inches long with 2 inch extended pitch.

| No. of Dogs | Max. spcg. between dogs | Lengths of wkpces. that can be fed | No. and length of dogs | | | |
|---|---|---|---|---|---|---|
| | | | 4″ | 5″ | 6″ | 7″ |
| 6 | 20 | 19.5 to 14.5 | 6 | | | |
| 8 | 15 | 14.5 to 11.5 | 2 | 2 | 2 | 2 |
| 10 | 12 | 11.5 to 9.5 | 10 | | | |
| 12 | 10 | 9.5 to 7.5 | 6 | | 6 | |
| 15 | 8 | 7.5 to 5.8 | 15 | | | |
| | | 5.8 to 2.0 [1] | | | | |

[1] Pieces shorter than 5.8 inches should be fed from magazine in multiple lengths.

It is to be noted that workpieces shorter than 5.8 inches, with the feeder apparatus used, were more satisfactorily fed from the magazine in multiple lengths, and that pieces which were shorter than 9.5 inches in length could be fed from the magazine two or more at a time. It is to be understood that with properly designed feeder apparatus, it is feasible to individually feed workpieces from the magazine for any reasonable length workpiece that is desired to be handled. When the workpieces are to be fed from the magazine in multiple lengths, they are loaded into the magazine in two or more rows of workpieces longitudinally positioned. The workpieces are then ejected from the magazine, by a feeder dog member, two or more at a time, and they are longitudinally fed into the work-carrying means as though they were an individual workpiece having a length equivalent to the combined length of the multiple workpieces.

The apparatus of Fig. 2 is, of course, a portion of the same apparatus as that shown in Fig. 1. The fourth track support surface 52 guides the support roller 42 of each feeder dog member 40 into the containing track 66 which follows the contour of the drive pulley 64, such that the feeder dog members 40 are guided around said pulley 64. The workpiece-guiding member 55 is shown adjustably mounted to the frame member 58 by means of an adjustable support. As shown in Figs. 1 and 2, the workpiece-guiding member 55 can be relatively positioned to accommodate workpieces 46 having different sizes and different diameters.

In Fig. 3 is shown the power supply arrangement for the drive pulley 64. The feeder dog member 40 is shown clear of the workpiece 46 due to the fourth track support surface 52 operating on the support roller 42. The relative contraction of the conveyor chain 20 is determined by the spacing between the first and second track support surfaces 36 and 38, and their respective operation with the support rollers 32 and 34 of the conveyor chain link members 22.

In the operation of the modified feeder apparatus shown in Fig. 6, the drive pulley 87 pushes the conveyor chain 85 away from it in a direction parallel to the workpiece path of movement. The first and second track support surfaces 88 and 90 are initially spaced apart a distance which prevents any lateral movement of the conveyor chain support rollers 110. After a feeder dog member 94 has engaged with a workpiece 92 in the magazine and starts to remove said workpiece from the magazine, the first track support surface 88 begins to separate from the second track support surface 90 such that the conveyor chain 85 begins to contract. The degree of contraction is determined by the relative spacing between the adjustable section of the first track support surface 88 and the second track support surface 90. The maximum spacing between the latter surfaces will allow the maximum contraction between any feeder dog member, which has engaged with a workpiece in the workpiece magazine, and the previous feeder dog member, which is moving the whole line of workpieces through the induction coil and quench unit. The tension bias spring member 86 between the first pivot points 82 of alternate link members assures that the conveyor chain 85 is contracted in the desired manner for a uniform relative spacing between successive pair of feeder dog members 94. The first track support surface 88 is extended to provide a return path for the conveyor chain 85 after the third track support surface 102 has allowed the feeder dog members 94 to disengage with the line of workpieces and pass on to the position where they are again moved by the drive pulley 87.

Although I have shown and described certain specific embodiments of my invention, I am fully aware that many modifications thereof are possible. My invention, therefore, is not to be restricted except insofar as is necessitated by the prior art and the spirit of the appended claims.

I claim as my invention:

1. In apparatus for feeding workpieces to processing equipment, the combination of a conveyor means including a chain portion extending in a predetermined first direction comprising a plurality of link members and a plurality of section members with each of said section members being connected between a pair of said link members, a track having at least a first and a second support surface with said first support surface having a substantially straight portion and a sloping portion at one end thereof, means for moving said chain portion longitudinally along said first direction between said first and second support surfaces, a plurality of spaced work-piece feeder dogs, each of said feeder dogs being pivotably connected to one of said link members, each of said link members having at least a first and a second pivot point, a first support roller at said first pivot point arranged to ride up said sloped end portion, and a second support roller connected to said link member and arranged to ride against said second support surface, said first support surface having at least a first and a second spaced position of operation, said first position being spaced from said second position in a direction substantially perpendicular to said predetermined first direction, with the spacing between said first and second support surfaces when said first surface is in said second position being substantially less than the distance between the outer extremities of said first and second support rollers such that each of said link member is constrained to pivot about the axis of said second roller as the link member rides up said sloped end portion, thereby orienting said link members and section members in relatively folded position so as to decrease the effective length of said chain portion between successive feeder dogs.

2. In workpiece handling apparatus, the combination of a conveyor means including a chain comprising a plurality of link members with each said link member having at least a first and a second pivot axis and a plurality of section members, each of said section members being connected between the first pivot axis of one link member and the second pivot axis of another link member, a plurality of spaced workpiece feeder dogs, each of said feeder dogs being pivotably connected to one of said link members, a first support roller connected to each link member at said first pivot axis and a second support roller connected to each link member at a predetermined distance from the plane of said first and second axes, a track mechanism having at least a first and second support surface, said first support surface being adjustably spaced from and substantially parallel to said second support surface to provide a pathway therebetween for said conveyor means, with said pathway having a transverse dimension perpendicular to said surfaces with said dimension being substantially less than the sum of said predetermined distance and the radius of said first roller plus the radius of said second roller, means for moving said chain longitudinally along said pathway to cause said first and second support surfaces to engage said first and second support rollers respectively, thereby pivoting said link members about said first pivot axis to effectively decrease the spacing between adjacent feeder dogs.

3. In workpiece processing equipment including a workpiece passageway, the combination of a conveyor means including a chain which comprises at least a plurality of link members and a like plurality of section members, each of said section members being pivotably connected between a pair of said link members, with each of said link members having at least a first and a second pivot axis each of said link members including a first support roller connected to said link member at said first pivot axis and a second support roller connected to said link, said second roller having a position spaced a predetermined distance from the plane of said first and second axes, a plurality of spaced feeder dogs, each being pivotably connected to one of said link members, and a track mechanism having at least a first and a second support surface, said surfaces being spaced apart to provide a pathway therebetween for said conveyor means with said first support surface being positioned adjacent and operable with said first support rollers and said second surface being positioned adjacent said second support rollers, said pathway being substantially parallel to said workpiece passageway and having a transverse dimension smaller than the width of said chain portion when said link members and section members are extended in end-to-end relation, said support surfaces being operable with said support rollers to pivot said link members to a position in which the plane of said first and second pivot points is disposed at an angle relative to said pathway to thereby decrease the effective length of said chain portion between successive feeder dogs.

References Cited in the file of this patent

UNITED STATES PATENTS

| 572,110 | Gray | Dec. 1, 1896 |
| 641,288 | Gray | Jan. 16, 1900 |
| 774,530 | Oppenheim | Nov. 8, 1904 |
| 800,783 | Adkins | Oct. 3, 1905 |
| 803,667 | Causey | Nov. 7, 1905 |
| 898,250 | Mitchell | Sept. 8, 1908 |
| 1,010,297 | Michener | Nov. 28, 1911 |
| 1,047,273 | Morris | Dec. 17, 1912 |
| 1,209,021 | Phillips | Dec. 19, 1916 |
| 1,232,051 | Kuhn | July 3, 1917 |
| 1,557,368 | Kershaw | Oct. 13, 1925 |
| 1,635,085 | Johnson | July 5, 1927 |
| 2,391,170 | Labombarde | Dec. 18, 1945 |
| 2,480,253 | Malhiot | Aug. 30, 1949 |
| 2,487,354 | McNamara | Nov. 8, 1949 |
| 2,534,054 | Parkes | Dec. 12, 1950 |

FOREIGN PATENTS

| 550,298 | Germany | May 7, 1932 |
| 454,952 | Great Britain | Oct. 12, 1936 |